(12) United States Patent
Leng

(10) Patent No.: US 8,017,212 B2
(45) Date of Patent: Sep. 13, 2011

(54) PAPER HONEYCOMB CORE COMPOSITE PANEL

(75) Inventor: Luhao Leng, Fujian (CN)

(73) Assignee: New-Tec Integration (Xiamen) Co., Ltd., Xiamen (CN)

( * ) Notice: Subject to any disclaimer, the term of this patent is extended or adjusted under 35 U.S.C. 154(b) by 871 days.

(21) Appl. No.: 11/663,368

(22) PCT Filed: Jul. 23, 2004

(86) PCT No.: PCT/CN2004/000852
§ 371 (c)(1),
(2), (4) Date: Mar. 19, 2007

(87) PCT Pub. No.: WO2005/010293
PCT Pub. Date: Feb. 3, 2005

(65) Prior Publication Data
US 2010/0112265 A1    May 6, 2010

(30) Foreign Application Priority Data
Jul. 28, 2003    (CN) .................................. 03 138 933

(51) Int. Cl.
*B32B 3/00* (2006.01)
*B32B 7/08* (2006.01)
*E04C 2/54* (2006.01)

(52) U.S. Cl. .............. 428/73; 428/52; 428/53; 52/783.1
(58) Field of Classification Search ...................... 428/73
See application file for complete search history.

(56) References Cited

U.S. PATENT DOCUMENTS

| | | | | |
|---|---|---|---|---|
| 4,084,366 A | * | 4/1978 | Saylor et al. | 52/791.1 |
| 4,749,601 A | * | 6/1988 | Hillinger | 428/73 |
| 5,034,256 A | * | 7/1991 | Santiso et al. | 428/73 |
| 5,694,865 A | * | 12/1997 | Raab | 108/161 |
| 5,792,541 A | * | 8/1998 | Herrera | 428/116 |
| 5,804,278 A | * | 9/1998 | Pike | 428/116 |
| 5,947,037 A | * | 9/1999 | Hornberger et al. | 108/115 |
| 2003/0163972 A1 | * | 9/2003 | Angenendt et al. | 52/793.1 |

* cited by examiner

*Primary Examiner* — Gordon R Baldwin
(74) *Attorney, Agent, or Firm* — Rabin & Berdo, P.C.

(57) ABSTRACT

A paper honeycomb core composite panel includes a face plate, a bottom plate, a paper honeycomb core sandwiched between the face plate and the bottom plate, e pieces of interior spacer disposed between the face plate and the bottom plate and extended entirely or partly around the periphery of the paper honeycomb core, and a edge sealing band which is bonded to the pieces of interior spacer or bonded to the pieces of interior spacer and the paper honeycomb core. The reinforcing frame of the composite panel makes use of the pieces of interior spacer including the pipe pieces or extrusive section material and so on. The edge sealing band or the pieces of interior spacer form the fringe of the composite panel.

10 Claims, 8 Drawing Sheets

PAPER HONEYCOMB CORE COMPOSITE PANEL

TECHNOLOGY FIELD

The invention pertains to daily necessities like furniture, and particularly relates to a paper honeycomb core composite panel.

BACKGROUND OF THE INVENTION

Due to the scarcities of timber resources, fibreboard, composite board, blow molding board and so have been developed as a substitute for timber. But fibreboard and composite board are too heavy, and blow molding board is easily deformed because of its hollow structure.

Chinese patent number CN2185674Y discloses a paper honeycomb core sandwich panel that includes a face plate and honeycomb core. The invention is of light weight and of high strength. But because of its hollow structure, it can not be better or unable to link with other parts. So the panel of the technology can not be generalized in furniture.

SUMMARY OF THE INVENTION

The purpose of this invention is to overcome the deficiency of available technology, to provide a paper honeycomb core composite panel which is light weight, high strength, easy cleaning and can conveniently connect with other parts.

The technical project of the invention to solve technical problems is:

A paper honeycomb core composite panel comprising
a face plate;
a bottom plate;
a paper honeycomb core which sandwiched between the face plate and the bottom plate;
some pieces of interior spacer disposed between the face plate and the bottom plate and extended entirely or partly around the periphery of the paper honeycomb core.

Said paper honeycomb core composite panel also comprises a edge sealing band which is circlewise linked between the edge of face plate and the edge of bottom plate, and is bonded to the pieces of interior spacer or bonded to the pieces of interior spacer and the paper honeycomb core.

Said edge sealing band is a whole piece or several pieces in which shape of the section of every piece can be same or different.

Said edge sealing band has T-shaped cross-section, arc-shaped horizontal edges, vertical edges being plugs which comprise barbs preventing shedding; plug grooves disposed in outer lateral edges of said pieces of interior spacer to accept the plugs.

Said pieces of interior spacer comprise corner spacer enwrapping corners of the paper honeycomb core and lateral edge spacer enwrapping lateral edge of the paper honeycomb core;

Said corner spacer is rectangular frame network forming a connector in suitable location; two adjacent inner lateral edges dispose in the paper honeycomb core; there are openings between the outer lateral edge and the inner lateral edge; lateral edge spacer has a width compatible with the openings; two ends of the lateral edge spacer respectively disposed in the openings of two adjacent corner spacer; inner lateral edges of the lateral edge spacer enwrap the paper honeycomb core; lateral edge spacer compose the frame of composite panel with corner spacer.

Plug grooves disposed in the outer lateral edges of corner spacer and the outer lateral edges of lateral edge spacer;
plugs forming in the edge sealing band to accept the plug grooves; the edge sealing band bonded with the composite panel through plugs.

The frame of composite panel composed by said corner spacer and lateral edge spacer, in which plug grooves forming in a pair of outer lateral edges; plugs forming in the edge sealing band to fit for the plug grooves; the edge sealing band bonded with the composite panel through plugs; another pair outer lateral edges are plane; the edge sealing band fixedly felted.

Said pieces of interior spacer also comprise partial edge spacer being cuboid; several grooves forming in parts of the lateral edge of the paper honeycomb core; said partial edge spacer encased in the grooves.

Said the paper honeycomb core is two-tier structure; it is ordinal bonded with face plate, first paper honeycomb, clapboard, second paper honeycomb, bottom plate; thickness of the pieces of interior spacer can be the same with thickness of the first paper honeycomb and bonded between the face plate and the second paper honeycomb.

Said face plate and bottom plate are melamine plate or fireproof plate.

The shape of said face plate and bottom plate is square, rectangular, round, oval, triangular, polygonal or profiled.

Said edge sealing band buckled bonded or sizy bonded with edges of the face plate, edges of the bottom, pieces of interior spacer or edges of the face plate, edges of the bottom, the pieces of interior spacer and the paper honeycomb core.

Said pieces of interior spacer are pipe pieces, extrusive section material, injection molded pieces or hardware pieces.

Said bottom plate also comprises integrative reinforcing pieces.

In the production process, the face plate and the bottom plate can be single plastic plate, multi-plastic composite plates, melamine plate or fireproof plate; and they can be machined or molded according to the required shape and size. The shape of said face plate and bottom plate can be square, rectangular, round, oval, triangular, polygonal or profiled. When using single plastic plate, its thickness can be between 0.3 mm to 4 mm, and materials of the single plastic plate can be ABS, PP, PS, PE, etc. When using multi-plastic composite plates, their thickness can be between 0.3 mm to 4 mm, and composite plates are compounded by ASA from 0.1 mm to 0.3 mm and ABS from 0.3 mm to 3.5 mm. The paper honeycomb core can be monolayer paper honeycomb core or monolayer paper honeycomb plate or double paper honeycomb plates or more than double paper honeycomb plates. When using double or more paper honeycomb plates, the size and shape of every paper honeycomb plate can be same or different. When having same shape and size, the pieces of interior spacer extend entirely or partly around the periphery of paper honeycomb plates. When having different shape and size, the pieces of interior spacer extend by steps around the periphery of paper honeycomb plates. Said pieces of interior spacer are pipe pieces, extrusive section material, injection molded pieces or hardware pieces. When the paper honeycomb core is monolayer paper honeycomb core or monolayer paper honeycomb plate or more than monolayer paper honeycomb plates in which every paper honeycomb plate has the same shape and size, the pieces of interior spacer extend around the periphery of paper honeycomb core entirely jointing bonded or sizy bonded with the face plate and the bottom plate. When paper honeycomb core is more than monolayer paper honeycomb plates in which every paper honeycomb plate has the different shape and size, the pieces of interior spacer extend around the periphery of paper honeycomb core entirety or partly jointing bonded or sizy bonded with face plate and bottom plate. For example, it can be two layers paper honeycomb plates in which the lower paper honeycomb plate has a bigger size than the upper paper honeycomb plate, the pieces of interior spacer jointing bond or sizy bond with the face plate with the larger area than the bottom plate. To seal composite plate edges, it can be edge sealing band or pieces of interior spacer extended around the periphery of paper honeycomb core.

The beneficial effect of this invention: Because of the usage of the direct molding melamine plate or fireproof plate or plastic plate as face plate and bottom plate, the composite panel can be designed varied shapes in various ways without additional processing, and it has a high moisture-proof capability and is liable to be purged. That light weight paper honeycomb core being as the core of composite panel make the composite panel have a light weight. Due to pieces of interior spacer being pipe pieces, extrusive section material, injection molded pieces, hardware pieces entirely extend around the periphery of paper honeycomb core, as the reinforcement frame, to make the intensity of the composite panel be boosted up, as well to make the intensity of the composite panel linked with other parts be boosted up. To seal composite plate edge, it can be edge sealing band or interior spacer extended around the periphery of paper honeycomb core, the appearance and practicality of the composite panel is greatly increased. Due to the edge sealing band can be buckled bonded link or sizy bonded increase installation flexibility. The invention of the paper honeycomb core composite panel is light weight, high strength, easy cleaning, low cost, of aesthetics and of environmental protection.

BRIEF DESCRIPTION OF THE DRAWINGS

Details of the invention and of the preferred embodiments thereof will be further understood upon reference to the drawings wherein. But with the invention of a paper honeycomb core composite panel is not confined to the embodiments.

EMBODIMENTS

Figure 1:
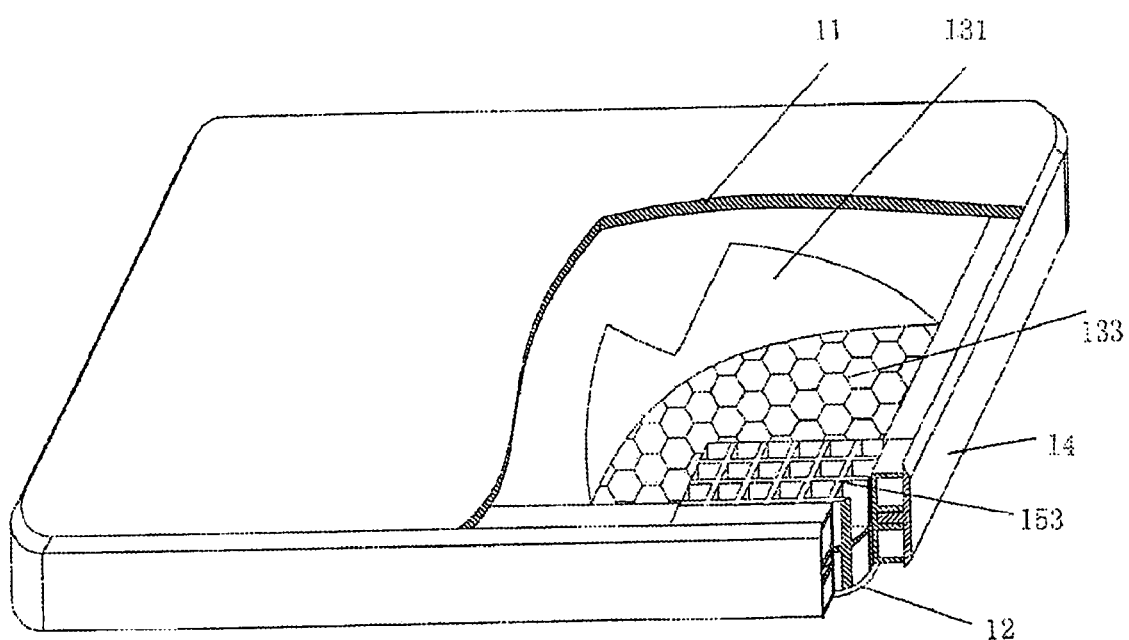
FIG. 1 is a three-dimensional structure of the invention embodiment one.
Figure 2:
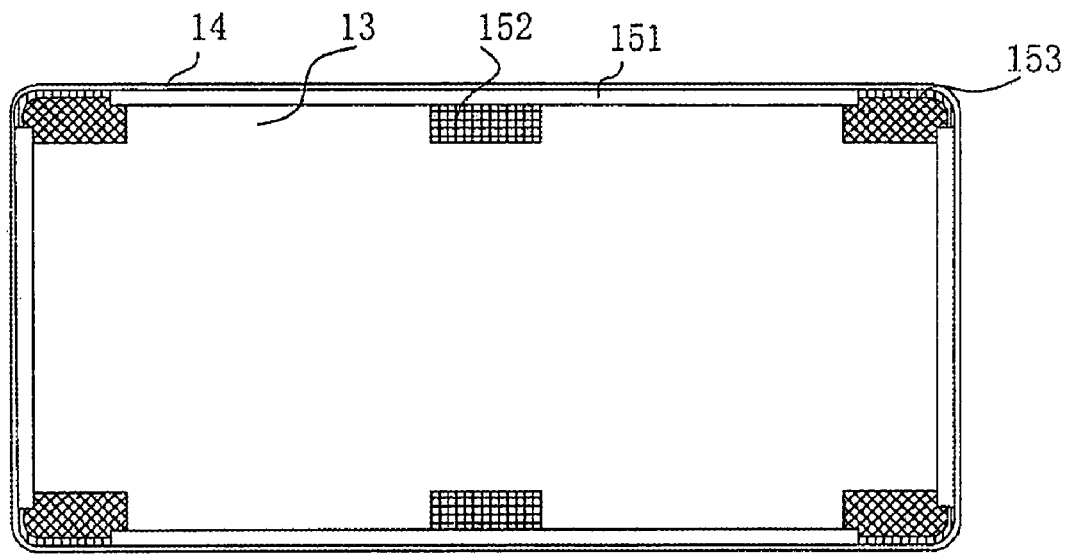
FIG. 2 is a cutaway view structure of the invention embodiment one.
Figure 3:
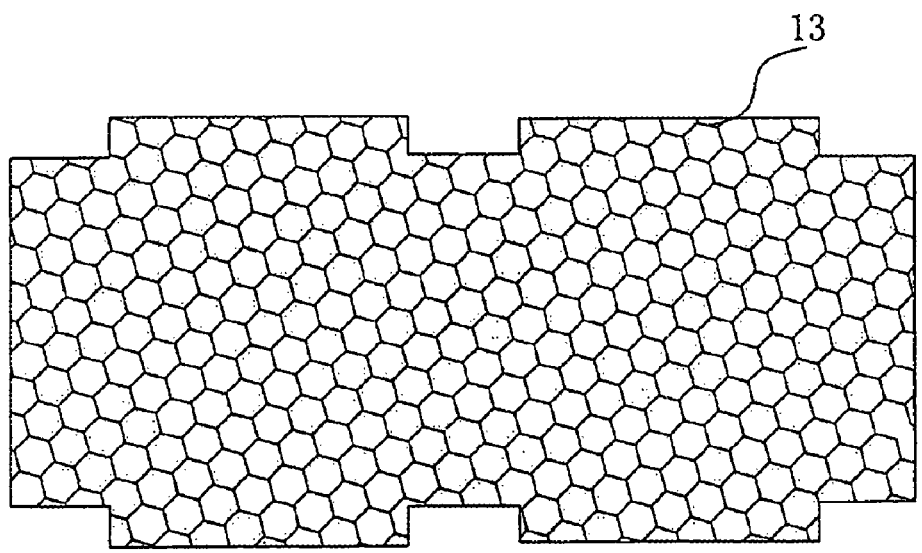
FIG. 3 is a sketch map structure of the paper honeycomb core of the invention embodiment one.

Embodiment one, referring to FIGS. 1 to 5, the paper honeycomb core composite panel according to the present invention comprises plastic face plate 11, plastic bottom plate 12, paper honeycomb core 13, edge sealing band 14 and pieces of interior spacer. The plastic face plate 11 and the plastic bottom plate 12 are oblong so that the composite panel made by them is oblong. The plastic face plate 11 and the plastic bottom plate 12 are made by a molding machine. The plastic face plate 11 and the plastic bottom plate 12 also can be melamine plate or fireproof plate, and varies in thickness ranging from 0.3 mm to 4 mm. The plastic face plate 11 and plastic bottom plate 12 are processed to obtain the required oblong size for the composite panel. The paper honeycomb core 13 is sandwiched between the molding plastic face plate 11 and the molding plastic bottom plate 12. The paper honeycomb core 13 comprises paper honeycomb 133, face paper 131 and bottom paper 132. The paper honeycomb 133 is sandwiched between the face paper 131 and the bottom paper 132 through an adhesive. The pieces of interior spacer are inserted between the plastic face plate 11 and the plastic bottom plate 12. The pieces of interior spacer comprise corner spacer 153 located at four corners, partial edge spacer 152 located at two comparative sides, and lateral edge spacer 151 located at four sides. Processing the paper honeycomb core 13 as FIG. 3, the corner spacer 153 and the partial edge spacer 152 and the lateral edge spacer 151 extend entirely around the periphery of the paper honeycomb core 13.

Corner spacer 153 is a rectangular frame network forming a connector 154 at suitable location. Two adjacent inner lateral edges are disposed in the paper honeycomb core. Openings 155 are formed between the outer lateral edge and the inner lateral edge.

The lateral edge spacer 151 has a width compatible with the openings 155. Two ends of the lateral edge spacer 151 are respectively disposed in the openings 155 of the two adjacent corner spacer 153. An inner lateral edge of the lateral edge spacer 151 enwraps the paper honeycomb core 13 and composes the frame of the composite panel with the corner spacer 153.

The edge sealing band 14 has a T-shaped cross-section, arc-shaped horizontal edges 142, and vertical edges being plugs 141 which comprise barbs preventing shedding. The edge sealing band 14 annularly links between the edge of face plate 11 and the edge of bottom plate 12. Plugs 141 of the edge sealing band 14 are inserted into plug grooves of the corner spacer 151 and the lateral edge spacer 153 to be an integrated composite panel.

In the production process, the face plate 11 and the bottom plate 12 can be single plastic plate, multi-plastic composite plates, melamine plate or fireproof plate; and they can be machined molded according to the required shape and size. The shape of said face plate and bottom plate can be square, rectangular, round, oval, triangular, polygonal or profiled. When using a single plastic plate, its thickness can be between 0.3 mm to 4 mm; and materials of the single plastic plate can be ABS, PP, PS, PE, etc. When using multi-plastic composite plates, their thickness can be between 0.3 mm to 4 mm; and composite plates are compounded by ASA from 0.1 mm to 0.3 mm and ABS from 0.3 mm to 3.5 mm. The paper honeycomb core is a monolayer paper honeycomb plate; the paper honeycomb plate 13 comprises paper honeycomb 133, face paper 131 and bottom paper 132; the paper honeycomb 133 is sandwiched between face paper 131 and bottom paper 132 through adhesive; the pieces of interior spacer jointing or sizy bonded with the plastic face plate 11 and the plastic bottom plate 12.

Figure 6:
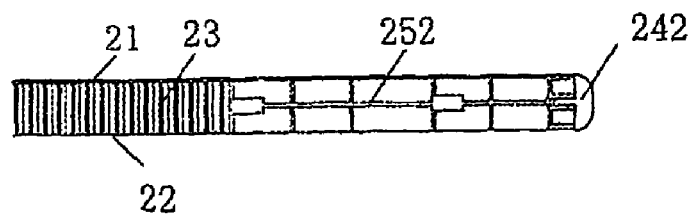
FIG. 6 is the first partial cutaway view of the invention embodiment two.
Figure 7:
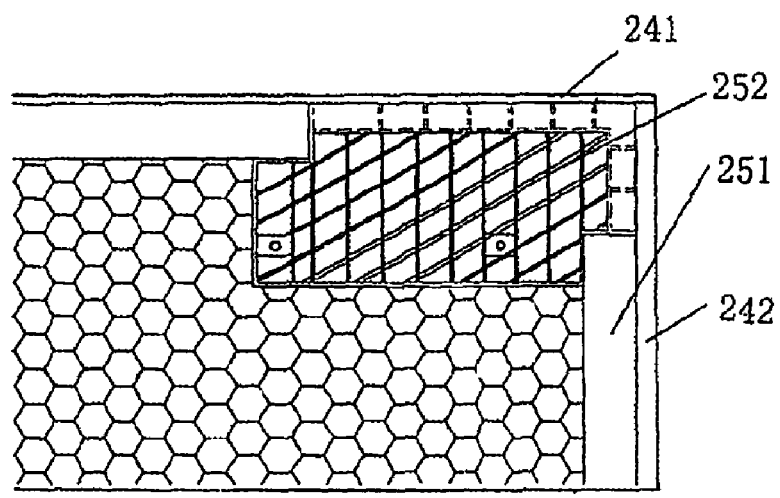
FIG. 7 is the second partial cutaway view of the invention embodiment two.
Figure 8:
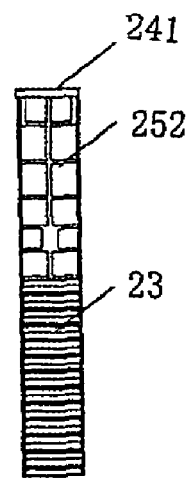
FIG. 8 is the third partial cutaway view of the invention embodiment two.

Embodiment two, referring to FIGS. 6 to 8, the invention of paper honeycomb core composite panel comprises plastic face plate 21, plastic bottom plate 22, paper honeycomb core 23, pieces of interior spacer 252 and pieces of interior spacer 251, the difference with embodiment one is: the edge sealing band comprises two relative edge sealing band 241 and two relative edge sealing band 242; the edge sealing band 241 have different section with the edge sealing band 242; the edge sealing band 241 bonded by glow and edge sealing band 242 bonded by wedge.

Figure 4:
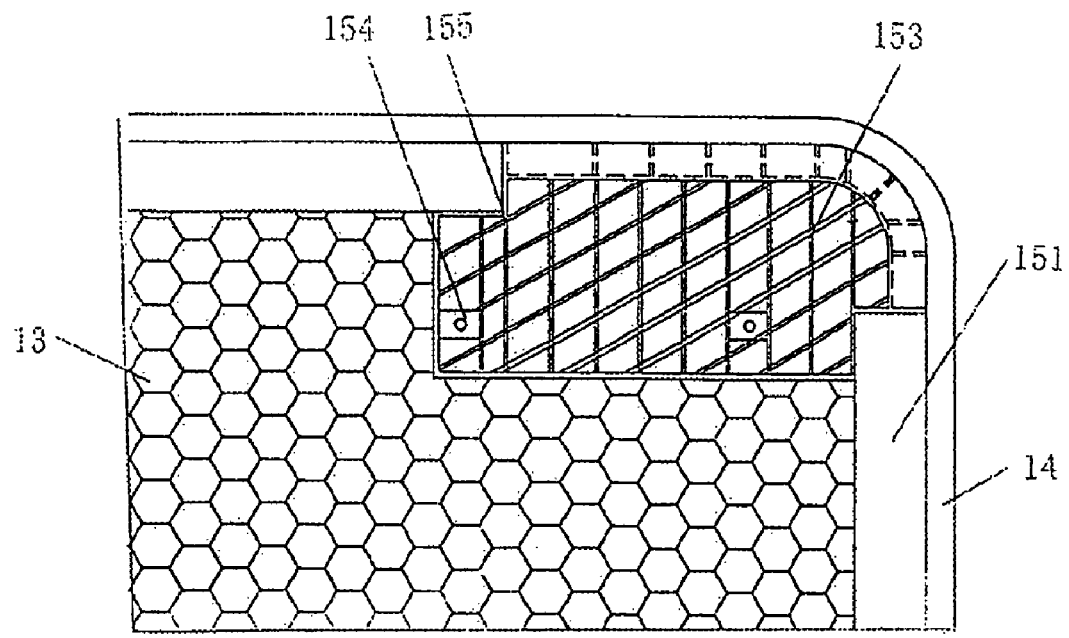
FIG. 4 is the first partial cutaway view of the invention embodiment one.
Figure 5:
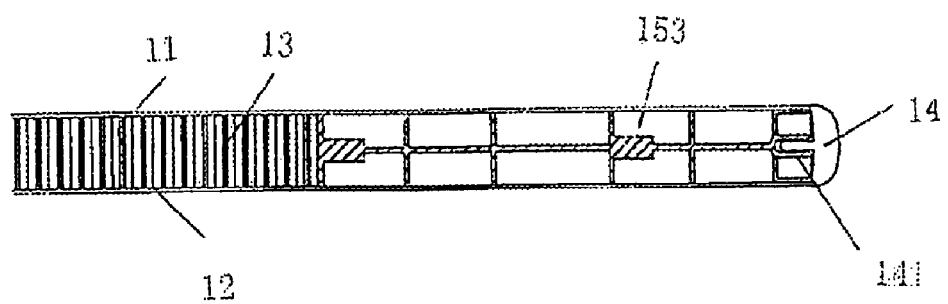
FIG. 5 is the second partial cutaway view of the invention embodiment one.
Figure 9:
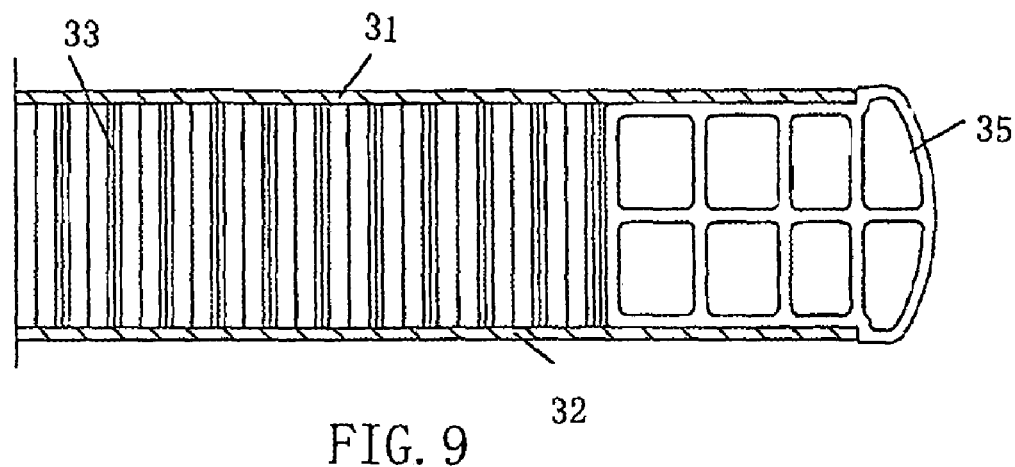
FIG. 9 is the partial cutaway view of the invention embodiment three.

Embodiment three, referring to FIG. 9, the invention of paper honeycomb core composite panel, the difference with embodiment one is: it comprises plastic face plate 31, plastic bottom 32, paper honeycomb core 33 and pieces of interior spacer 35. Referring to FIGS. 4 and 5, the pieces of interior spacer 35 make the corner spacer 153 and the lateral edge liner 151 and the edge closeout lateral a whole; and its section is frame network; its outer lateral side is arc-shape; and it extends around the periphery of the paper honeycomb core 33.

Figure 10:
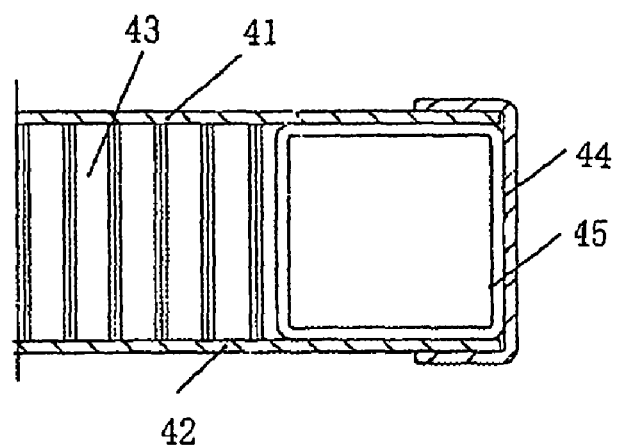
FIG. 10 is the partial cutaway view of the invention embodiment four.

Embodiment four, referring to FIG. 10, the invention of paper honeycomb core composite panel, the difference with embodiment one is: it comprises plastic face plate 41, plastic bottom plate 42, paper honeycomb core 43, pieces of interior spacer 45 and edge sealing band 44; pieces of interior spacer 45 has .quadrature. shape section extending around the periphery of the paper honeycomb core 33. The edge sealing band 44 circlewise linked between the edge of face plate 41 and the edge of face plate 42; the edge sealing band 44 comprises bended parts adhibiting with the edge of face late 41 and the edge of bottom plate 42 and pieces of interior spacer 45.

Figure 11:
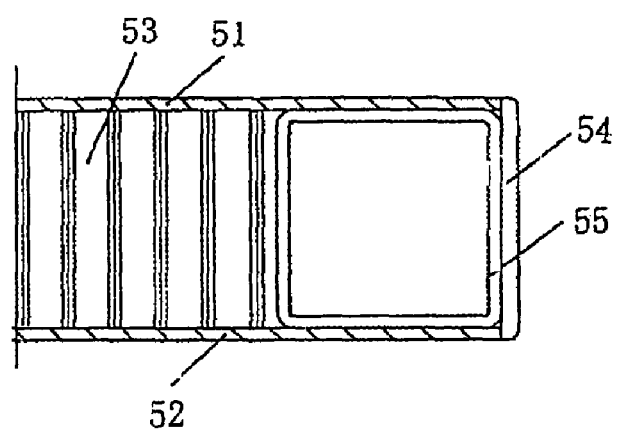
FIG. 11 is the partial cutaway view of the invention embodiment five.

Embodiment five, referring to FIG. 11, the invention of paper honeycomb core composite panel, the difference with the embodiment four is: it comprises plastic face plate 51, plastic bottom plate 52, paper honeycomb core 53, pieces of interior spacer 55 and edge sealing band 54. The edge sealing band 54 circlewise linked between the edge of face plate 51 and the edge of face plate 52. The edge sealing band 54 adhibit with the edge of face late 51 and the edge of bottom plate 52 and pieces of interior spacer 45.

Figure 12:
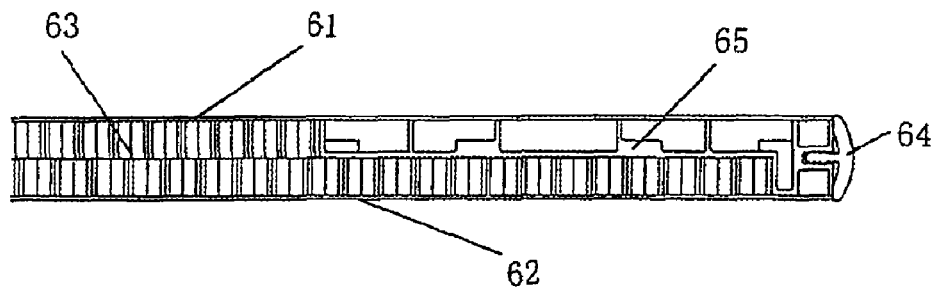
FIG. 12 is the first partial cutaway view of the invention embodiment six.
Figure 13:
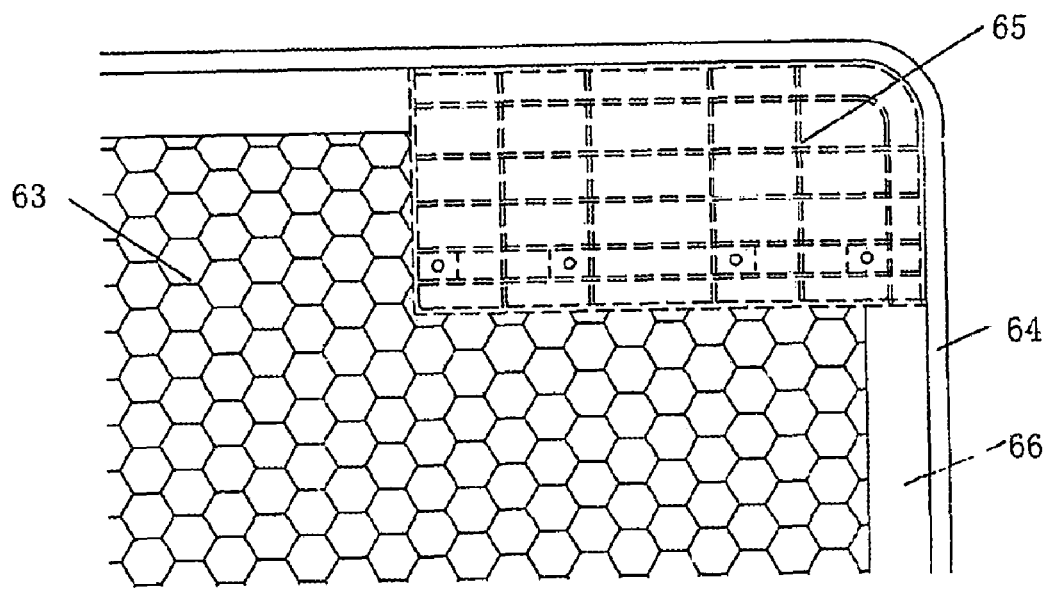
FIG. 13 is the second partial cutaway view of the invention embodiment six.
Figure 14:
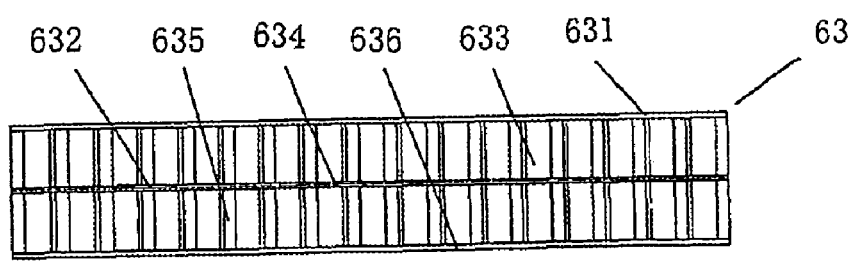
FIG. 14 is a sketch map structure of the paper honeycomb core of the invention embodiment six.

Embodiment six, referring to FIGS. 12 to 14, the invention of paper honeycomb core composite panel comprises plastic face plate 61, plastic bottom plate 62, paper honeycomb core 63, corner spacer 65, lateral edge spacer 66 and edge sealing band 64.

The paper honeycomb core 63 includes two-layer paper honeycomb plates; the upper paper honeycomb plate comprises paper honeycomb 633, face paper 631, bottom paper 632; the paper honeycomb 633 is sandwiched between face paper 631 and bottom paper 632 and fixed felted with face paper 631 and bottom paper 632; the lower paper honeycomb plate comprises paper honeycomb 635, face paper 634, bottom paper 636; the paper honeycomb 636 is sandwiched between face paper 634 and bottom paper 636 and fixed felted with face paper 631 and bottom paper 632; the upper paper honeycomb plate fixed felted with the lower paper honeycomb plate.

Corner spacer 65 is oblong frame; its height is the same with the thickness of the paper honeycomb 633; its two outer lateral sides protuberantly disposed out of the paper honeycomb core 63 having the same height with the thickness of paper honeycomb core 63; corner spacer 65 and lateral edge spacer 66 constitute the frame of composite panel in which plug grooves disposed in its outer lateral side; the edge sealing band 64 circlewise linked between the edge of face plate 61 and the edge of face plate 62; inserting plugs of the edge sealing band 64 into plug grooves of the corner spacer 65 and lateral edge spacer 66 to come into being the integrated composite panel.

Figure 15:
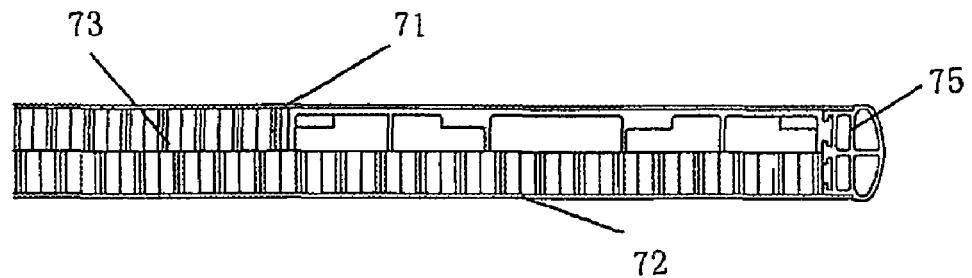
FIG. 15 is the first partial cutaway view of the invention embodiment seven.
Figure 16:
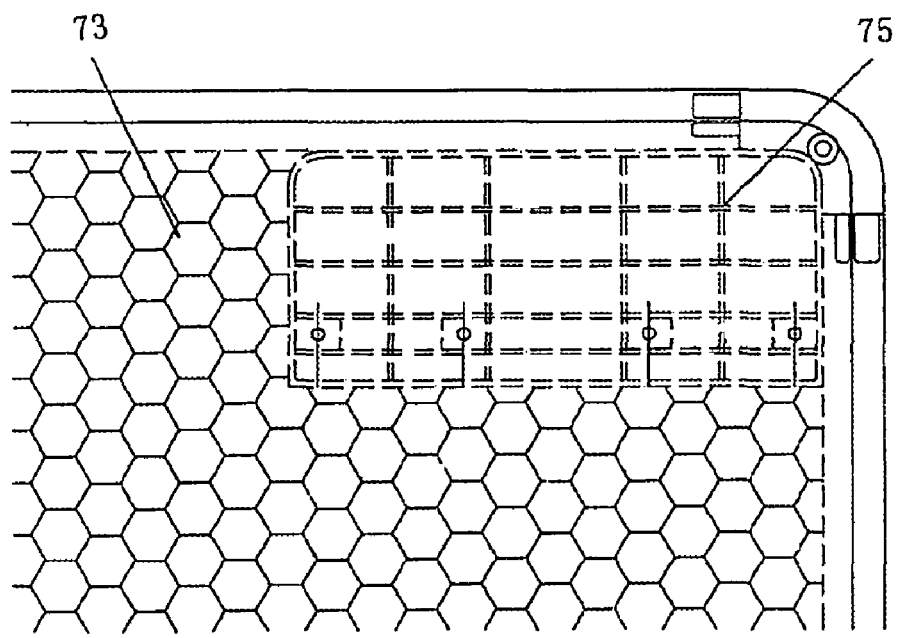
FIG. 16 is the second partial cutaway view of the invention embodiment seven.

Embodiment seven, referring to FIGS. 15 and 16, the invention of paper honeycomb core composite panel comprises plastic face plate 71, plastic bottom plate 72, paper honeycomb core 73 and pieces of interior spacer 75, the difference with embodiment six is: it has pieces of interior spacer 75 as edges instead of edge sealing band.

Figure 17:
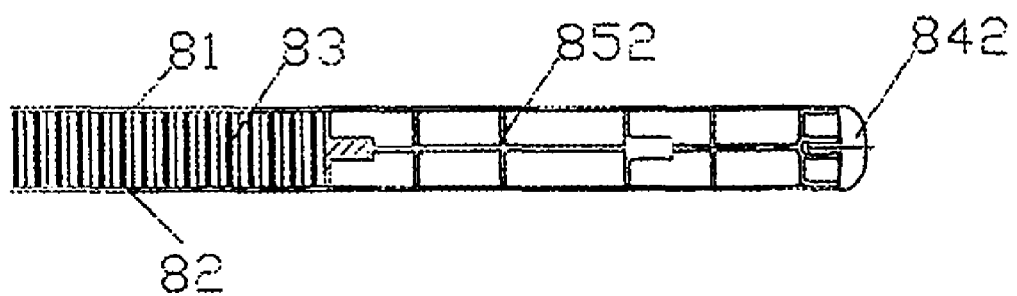
FIG. 17 is the first partial cutaway view of the invention embodiment eight.
Figure 18:
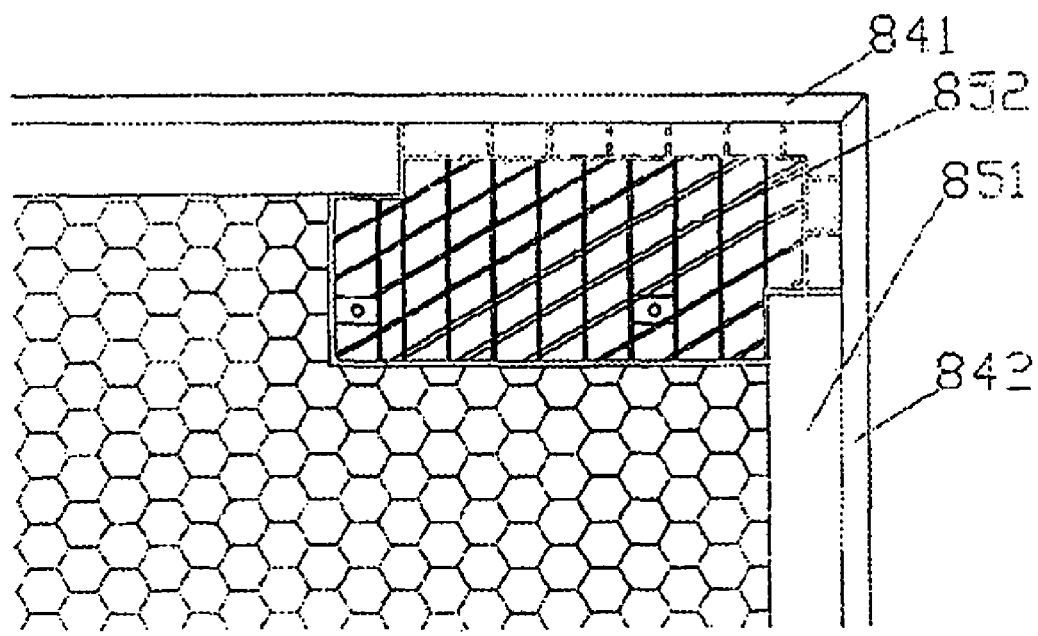
FIG. 18 is the second partial cutaway view of the invention embodiment eight.

Embodiment eight, referring to FIGS. 17 and 18, the invention of paper honeycomb core composite panel comprises plastic face plate 81, plastic bottom plate 82, paper honeycomb core 83, pieces of interior spacer 852 and pieces of interior spacer 851, the difference with embodiment one is: the edge sealing band comprise two relative edge sealing band 841 and two relative edge sealing band 842, edge sealing band 841 has the same section with the edge sealing band 842.

INDUSTRY PRACTICABILITY

The invention of paper honeycomb core composite panel consists of a face plate, a bottom plate, a paper honeycomb core which sandwiched between the face plate and the bottom plate, some pieces of interior spacer disposed between the face plate and the bottom plate and extended entirety or partly around the periphery of the paper honeycomb core, and a edge sealing band which is bonded to the pieces of interior spacer or bonded to the pieces of interior spacer and the paper honeycomb core. The invention has simple structure and can be largely produced and has industry practicability.

I claim:

1. A paper honeycomb core composite panel, comprising:
    a face plate;
    a bottom plate;
    a paper honeycomb core sandwiched between the faceplate and the bottom plate;
    a plurality of interior spacers disposed between the face plate and the bottom plate, the plurality of interior spacers including corner spacers enwrapping corners of the paper honeycomb core and lateral edge spacers enwrapping lateral edges of the paper honeycomb core;
    wherein each of the corner spacers is surrounded by two lateral edge spacers and each of the lateral edge spacers is surrounded by two corner spacers; and
    an edge sealing band having a "T"-shaped cross-section, wherein a horizontal bar of the "T" is arc-shaped, and a vertical bar of the "T" is adapted to be a plug; wherein the plurality of interior spacers has grooves for receiving the plug and holding the edge sealing band.

2. The paper honeycomb core composite panel according to claim 1, wherein said corner spacer is a rectangular net framework forming a connector and has two adjacent inner lateral edges facing the paper honeycomb core and recessions between each outer lateral edge and each inner lateral edge;

wherein the lateral edge spacers are disposed in the recessions of two surrounding corner spacers;

wherein the lateral edge spacers and the corner spacers form a frame of the composite panel;

wherein a pair of the lateral edge spacers of the frame has grooves for receiving the plug of the edge sealing band with the "T"-shaped cross-section and wherein another pair of the lateral edge spacers of the frame is adhered to the edge sealing band.

3. The paper honeycomb core composite panel according to claim 1, wherein at least one of the face plate and the bottom plate is a melamine plate or a fireproof plate.

4. The paper honeycomb core composite panel according to claim 1, wherein the shape of the face plate and the bottom plate is square, rectangular, round, oval, triangular, polygonal or profiled.

5. The paper honeycomb core composite panel according to claim 1, wherein said edge sealing band is glued or locked to edges of the face plate, edges of the bottom plate, the plurality of interior spacers or the paper honeycomb core.

6. The paper honeycomb core composite panel according to claim 1, wherein the plurality of interior spacers are pipe pieces, press-formed pieces, injection molded pieces or metal pieces.

7. A paper honeycomb core composite panel, comprising:
a face plate;
a bottom plate;
a paper honeycomb core sandwiched between the faceplate and the bottom plate; and
a plurality of interior spacers disposed between the face plate and the bottom plate, the plurality of interior spacers including corner spacers enwrapping corners of the paper honeycomb core and lateral edge spacers enwrapping lateral edges of the paper honeycomb core;
wherein each of the corner spacers is surrounded by two lateral edge spacers and each of the lateral edge spacers is surrounded by two corner spacers; and
wherein each said corner spacer is a rectangular net framework forming a connector and has two adjacent inner lateral edges facing the paper honeycomb core and recessions between each outer lateral edge and each inner lateral edge;
wherein the lateral edge spacers have a width compatible with the recessions;
wherein the lateral edge spacers are disposed in the recessions of two surrounding corner spacers;
wherein inner lateral edges of the lateral edge spacers enwrap the paper honeycomb core; and wherein the lateral edge spacers and the corner spacers form a frame of the composite panel.

8. The paper honeycomb core composite panel according to claim 7, wherein said the plurality of interior spacers further comprises partial edge spacers, the partial edge spacers being rectangle; wherein the lateral edge of the paper honeycomb core has recessions, and wherein partial edge spacers are encased in the recessions.

9. A paper honeycomb core composite panel, comprising:
a face plate;
a bottom plate;
a paper honeycomb core sandwiched between the faceplate and the bottom plate;
a plurality of interior spacers disposed between the face plate and the bottom plate, the plurality of interior spacers including corner spacers enwrapping corners of the paper honeycomb core and lateral edge spacers enwrapping lateral edges of the paper honeycomb core; and
an edge sealing band sealing circumferentially between an edge of the face plate and an edge of the bottom plate, and bonded to the plurality of interior spacers,
wherein each of the corner spacers is surrounded by two lateral edge spacers and each of the lateral edge spacers is surrounded by two corner spacers, and
wherein the corner spacers and the lateral edge spacers have grooves for accepting the edge sealing band with T-shaped cross-section; the edge sealing band being bonded with the composite panel.

10. A paper honeycomb core composite panel, comprising:
a face plate;
a bottom plate;
a paper honeycomb core sandwiched between the faceplate and the bottom plate; and
a plurality of interior spacers disposed between the face plate and the bottom plate, the plurality of interior spacers including corner spacers enwrapping corners of the paper honeycomb core and lateral edge spacers enwrapping lateral edges of the paper honeycomb core;
wherein each of the corner spacers is surrounded by two lateral edge spacers and each of the lateral edge spacers is surrounded by two corner spacers; and
wherein the paper honeycomb core has a two-tier structure including the face plate, a first paper honeycomb, a clapboard, a second paper honeycomb, and the bottom plate; wherein a thickness of the plurality of interior spacers equals a thickness of the first paper honeycomb, and wherein the plurality of interior spacers is located between the face plate and the second paper honeycomb.

* * * * *